Oct. 28, 1969  B. QUANQUIN ET AL  3,475,195
PROCESS AND APPARATUS FOR GRANULATING PASTE
Filed Nov. 30, 1965
FIG. 1
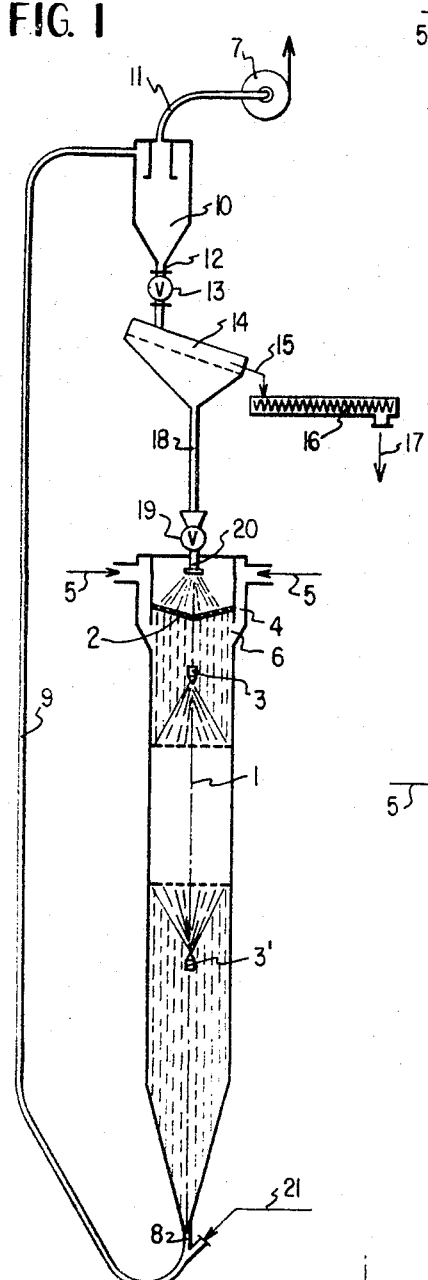
FIG. 2
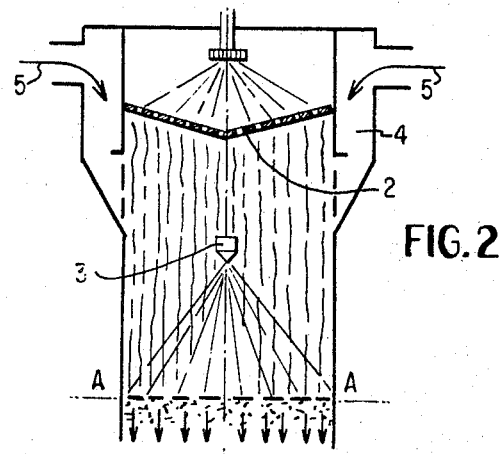
FIG. 3
FIG. 4
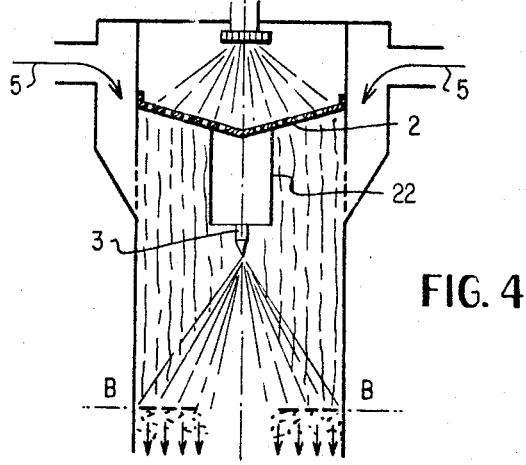
FIG. 5
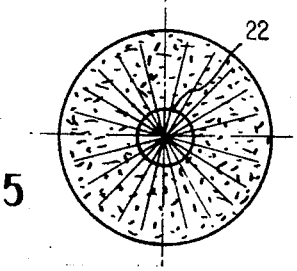
INVENTORS.
BERNARD QUANQUIN
GEORGES MARIE LE CLERC
JEAN-LOUIS PIERRE
BY J. Wilkin Miller ATTORNEY.

United States Patent Office 3,475,195
Patented Oct. 28, 1969

3,475,195
PROCESS AND APPARATUS FOR GRANULATING PASTE
Bernard Quanquin, Georges Marie Le Clerc, and Jean-Louis Pierre, Grand'Couronne, France, assignors to Potasse & Engrais Chimiques, Paris, France
Filed Nov. 30, 1965, Ser. No. 510,549
Claims priority, application France, Dec. 1, 1964, 996,924
Int. Cl. B44c *1/06;* B05c *5/00, 17/00*
U.S. Cl. 117—66
17 Claims

ABSTRACT OF THE DISCLOSURE

A paste is granulated by spraying it onto fines in the presence of a gaseous flow stream. The fines are charged into a closure having a vertical axis of symmetry, uniformly distributed over an upper section thereof and permitted to fall by gravity following paths parallel to the axis of symmetry. A stream of gas is passed downwardly into the falling fines parallel to the axis of symmetry, and the paste to be granulated is projected onto the falling fines from a spraying device positioned in the vicinity of the axis of symmetry.

---

The present invention relates in general to a process and an apparatus for obtaining, in a granulated form, solid products from melts, solutions or slurries. According to this new process, a melted product can be simultaneously cooled and granulated and a solution or a slurry can also be dried and granulated in the same operation.

Many processes have been proposed and are being used in the fertilizer industry to transform these pastes into dry and hard granules. By "paste" we mean any substance to be granulated, whatever its physical form, i.e., melt, solution or slurry.

One of these conventional processes consists in transforming into granules molten materials and highly concentrated aqueous solutions by using the prilling technique. In such processes, the paste to be treated is sprayed downwardly from the top of a tower which is high enough for the droplets to cool and harden during their fall whereby to form small and substantially spherical granules or prills. However, the typical prilling process is suitable only with pastes having a very low moisture content, usually less than 5 to 6%.

Another industrial method consists in atomizing into fine droplets a paste which is directed onto small moving solid particles thereby coating their surface with a thin layer of paste. The liquid paste then is hardened by either cooling or drying, depending on the nature of the paste. The small particles or cores to be coated with atomized paste are usually obtained by classifying the product coming from the granulating apparatus. More often, the product is separated by screening into a first fraction of large size particles hereinafter designated as "coarse particles," a second fraction of granules within the desired range of marketable sizes hereinafter designated as "marketable product," and a third fraction of fine granules hereinafter designated as "fines." After the screening operation, the coarse particles are crushed and optionally resieved, thus resulting in an additional quantity of fines which are added to those of the third fraction and recycled to the granulator to then be coated with atomized paste.

The above-described technique of growing granules by the deposition of successive coating layers on cores is usually performed, either on a rotating inclined pan or in a rotary drum. The paste is atomized onto recycled fines which are maintained in continuous motion by the rotation of a pan or drum and simultaneously the layers of paste are hardened by a gaseous flowstream in contact therewith. A hot air stream is used when drying a solution or a slurry and a cold air stream when solidifying a melt.

Processes of this type all have the disadvantage that the equipment employed (rotating pan or drum) prevents a uniform distribution of paste on the cores. When the fines are set into motion by means of a rotating surface, the speed and path of the cores cannot be controlled accurately and hence the cores are distributed unevenly in front of the jets of droplets projected by the spraying device. Some of the cores are therefore coated with several layers of varying thickness, thus growing beyond the desired size; at the same time other cores receive no coating or only a very thin layer, and thus their size is not increased sufficiently. Under such operating conditions, there is obtained a large proportion of coarse particles and fines and it is this excess of fines resulting from insufficient coating of the cores together with the crushed coarse particles which must be recycled. Uneven distribution of paste on the cores tends, therefore, to reduce the output of marketable product and increases the recycle ratio, i.e. the weight ratio of recycled fines to marketable product. Furthermore, the size of all equipment used, viz.: granulating, handling, screening and crushing equipment, increases with the recycle ratio which in turn results in increased operating costs (electric power, maintenance, etc . . .).

The heretofore known granulators utilizing a spraying device are fraught with yet additional problems. That is, the fines set into motion by means of a rotating surface which can be provided with lifters such as for instance, scoops, are in nearly constant contact with each other, or with the rotating surface during and after the cores have been coated with paste. The freshly coated cores tend to stick together, and form coarse particles, also adhere to and build up on the rotating surface, thereby forming hard deposits which hinder the operation of the granulator.

In another well known granulating process, the paste is projected upwardly jointly with a gaseous flow stream through a bed of priming granules (or cores) maintained in suspension and in continuous circulation by the gaseous flow stream. This method of granulating improves the distribution of paste on the cores, as compared to the methods using a rotating surface, and hence the recycle ratio is lower. However, a large quantity of power is necessary to maintain the granules in suspension, thereby increasing the operating costs. Moreover, the capacity of such granulators is limited and it would find little use in plants requiring a high production capacity.

It is therefore a principal object of this invention to provide an improved process and apparatus for granulating a paste which results in an increased production of marketable product.

It is another object of the invention to provide a more economical process and apparatus for granulating a paste by applying it as a coating to a substrate.

It is still another object of the invention to provide an improved process of granulating a paste wherein substrates are uniformly coated therewith and maintained out of contact until the coating is solidified.

These and other objects and advantages will become apparent hereinafter by reference to the description, claims, and drawing appended hereto.

In accordance with the present invention, the process of granulating a paste in an enclosure having an upper and lower section by spraying it on fines recycled from a prior operation in the presence of a gaseous flow stream is surprisingly improved by feeding the fines to the top of an enclosure having a vertical axis of symmetry. The fines are then evenly and uniformly distributed through at least a portion of the cross section of the enclosure in an upper section thereof and the particles are then released and allowed to fall by gravity following paths parallel to the aforementioned axis of symmetry. The paste to be granulated is projected onto the fines or cores while they are falling by means of at least one spraying device placed on or in the vicinity of the axis of symmetry and the gaseous flow stream is practically parallel to the paths of the fines.

Since the symmetry axis is common and parallel to the paths of the cores, droplets of paste and the gaseous streams, a more uniform distribution of paste on the fines is obtainable than in prior art processes. Distribution of the coating is further improved by the fact that the cores are falling at practically the same speed as they pass through the zone containing the sprayed coating. During their fall, the cores remain apart from each other, thus preventing the freshly coated granules from sticking together. Moreover, the formation of deposits on the granulator walls is prevented, or at least notably reduced.

In practicing the process of the invention, the fines (or cores) are fed into the top of a vertical enclosure, preferably of cylindrical shape, by means of any mechanical distributor such as a vibrating screen or any similar means which can evenly spread the fines through all or part of the cross section of the enclosure. In this connection, it is to be understood that enclosures can be utilized in the process of this invention which do not per se have a vertical axis of symmetry. In such instances, it is necessary that the zone, from the top to the bottom of the enclosure, through which the particles are falling have a vertical axis of symmetry. That is to say, that none of the falling particles strike the sides of the enclosure during their vertical passage to the bottom thereof. The enclosure must be high enough to enable the shower of cores falling by gravity to have a uniform distribution through the cross-section.

The sprayer (or sprayers) projecting the paste are preferably directed such that the axis of the cone formed by the sprayed particles is parallel to the axis of symmetry of the enclosure and, hence, to the path of the falling fines (or cores). Thus, the best possible symmetry between the dispersed fines and droplets of paste is obtained.

In high capacity granulators employing a high feed rate of paste, one or several sprayers can be used. When several sprayers are used, they can be placed either at the same level or at one of several different levels. With the latter arrangement, it is possible to coat the fines with several successive layers of paste during one pass through the granulator. In this case, the height of the enclosure and the space between spraying levels must be sufficient to allow each layer of paste on the cores to harden, at least partially, before reaching the next spraying level. In most instances, it is preferable to spray the paste at different levels, thereby depositing two or more very thin successive layers of paste rather than one thicker layer.

The method of the present invention has the additional advantage that the paste is more evenly sprayed owing to the greater number of impacts between the cores and the droplets of paste. Once more, the probability of many impacts taking place on different parts of the cores is increased, improving the spherical shape of the granules obtained. Also, a plurality of thin paste layers offers a total evaporating or cooling surface greater than one thicker layer, thereby increasing significantly heat exchange between the gas and coated cores. Further, by utilizing several sprayers at different levels, increased feed rates of paste can be used without affecting the quality of the spraying i.e., with a projection of fine and regular droplets.

By selecting the spraying level (or levels), the thickness of the coating can be controlled, thereby producing particles of a desired size. When the distance between the feeding point of the fines and a spraying level is increased, the velocity of the cores reaching the spray zone is increased and hence the time during which the cores are being coated is reduced. The layer of paste deposited on the cores is accordingly thinner, and this operating variable provides yet another method of controlling the size of the granules.

In order to increase the flexibility of the granulator, it is generally advantageous to provide an enclosure having vertically adjustable sprayers. In such an arrangement, the sprayers are slidably affixed to supports, thereby enabling the operator to vary the spraying level (or levels) according to the nature and characteristics of the pastes to be treated. By adjusting the spraying level, the thickness of the layers is similarly varied without necessitating a change in the rate of spraying. In the alternative, when the granulator is to be operated under only one set of conditions, the sprayers (or sprayers) can be mounted at a fixed level without any inconvenience.

As a general rule, the process of the present invention can be applied to any liquid substance having a viscosity sufficiently low to permit the same to be divided into fine droplets by means of a spraying device and which can solidify when cooled or dried. This process is applicable particularly to fertilizers obtained as a melt (urea for instance), aqueous concentrated solutions (ammonium nitrate solutions for instance) or slurries, such as the various pastes obtained during the manufacture of complex fertilizers by the nitrosulfuric, nitrophosphoric, nitrocarbonic processes, and the like.

The jet of paste projected by the sprayer (or sprayers) can be directed either downwardly, i.e., in the same direction as the falling fines, or upwardly and countercurrent to the falling fines. The descending (cocurrent) or ascending (countercurrent) direction of the spray cone depends on the nature of the paste to be granulated: for example, countercurrent spraying may be advantageous when treating a quick setting paste such as, for instance, slurries having low water content, or melts. Therefore, in a granulator in which various types of pastes are to be treated, the sprayers are preferably rotatable to permit the spray to be directed either upwardly or downwardly. However, it has been observed that the sprayers positioned in the upper part of the enclosure give best results when directing coating material cocurrent to the fines, whereas sprayers positioned in the lower part of the enclosure are more effective when projecting spray countercurrent to the fines.

In granulators utilizing several sprays, some of the jets can be directed cocurrently and others countercurrently. In a particularly advantageous embodiment, one or several sprayers mounted in the upper portion of the enclosure direct paste cocurrent to the fines, and one or several sprayers mounted at one or several lower levels alternate or swivel from a cocurrent to a counter-current direction.

A gaseous stream used in hardening the layer of paste deposited on the surface of the cores is fed continuously into the granulator where it flows jointly with the falling cores. This gaseous stream is introduced into the enclosure and is uniformly distributed in the upper portion thereof so that the gas flows at substantially the same velocity through the enclosure. The gaseous streamlets, being substantially parallel to the paths of the cores, do not disturb their fall. The gas travels through the intergranular spaces and heat exchange thereof with the coated cores hardens the freshly deposited layers of paste. Depending upon the nature of the paste being sprayed, it is customary to utilize a hot gas for drying solutions or slurries and a cold gas for cooling hot melts.

The cores coated with one or several layers of paste are then withdrawn from the bottom of the enclosure and transported to a classifying unit. When operating according to the process of the present invention, substantially no coarse particles are obtained, and the crushing equipment heretofore necessary is thus eliminated. The granules withdrawn from the granulator lie within a very narrow size range, the extreme values of which differ very little from the desired size. This rather uniform size of the product facilitates considerably the ease of spreading the particles evenly with the usual mechanical equipment.

The granules withdrawn at the bottom are returned to the top of the granulator by mechanical means such as, for instance, a bucket elevator or else by pneumatic transport. In the latter case, the granules are in contact with the drying or cooling gas for a longer duration and this method is of particular advantage when treating slow hardening pastes.

In practicing this invention, it is desirable to optimize the paste granulating process by employing operating parameters which are specific to the size of equipment and types of materials being treated. Although this process is universally applicable for granulating in general, it is desirable to employ the same when fines having a particle size of 0.2 to 2.5 mm., preferably 1 to 2 mm., are to be coated. The downwardly directed gas stream accompanying the falling fines flows at a velocity of 1.5 to 8, preferably 2.5 to 5 ft./sec. The velocity of the gas stream must be chosen according to the heat exchange needed between gas and cores coated with paste. For example, when the paste has a very large water content, the gas velocity is higher and when the paste has a low water content or is a melt, the gas velocity is smaller.

Yet another limiting factor is the size of the tower itself for the reason that it is desirable to maintain a minimum interparticle distance to provide space for the sprayed paste particles. When the interparticle distance is smaller than the predetermined minimum and a high mass flow of atomized paste is used, there is a tendency for the resulting coated particles to agglomerate and form lumps. Further, the sides of the tower become coated and eventually operation must be discontinued to clean the same.

To prevent overloading the tower and optimize the production of coated fines of a desired size it is desirable to employ a particle mass flow rate of 50 to 200 preferably 75 to 150 ft.$^3$ of fines/ft.$^2$ of tower cross-section-hr. and a paste mass flow of 1 to 5 preferably 1.5 to 4 ft$^3$ of spray/ft$^2$ of tower-hr. In a typical process of granulating complex fertilizers in the form of a paste having a water content of 18%, 2.6 ft.$^3$ of paste/ft.$^2$ of tower-hr. is employed with fines having a particle size of 0.8 to 2 mm. and a mass flow of 145 ft.$^3$ of particles/ft.$^2$ of tower-hr. For granulating a very concentrated solution of ammonitrate having a water content of 5%, 3.9 ft.$^3$ of solution/ft.$^2$ of tower-hr. is employed with fines having a particle size of 0.7 to 1.8 mm. and a mass flow of 85 ft.$^3$ of particles/ft.$^2$ of tower-hr.

The following preferred specific embodiments are to be construed as merely illustrative and not limitative and are described in the accompanying drawings wherein:

FIGURE 1 shows a schematic side elevation view with an axial section of a granulator suitable for practicing the process of the present invention.

FIGURE 2 is a partial section showing the details of the upper part of the granulator of FIGURE 1.

FIGURE 3 is a transverse section taken along line A—A of FIGURE 2.

FIGURE 4 illustrates a second embodiment of the upper part of the granulator shown in FIGURE 1.

FIGURE 5 is a transverse section taken along the line B—B of FIGURE 4.

The granulator in FIGURE 1 comprises a vertical cylindro-conical tower shown generally at 1, having at the top thereof a vibrating screen 2, which distributes the fines or cores through the entire section of the tower as shown in detail in FIGURES 2 and 3. The fines shower down from the distributor 2 in the form of a cylinder and the paths of the cores are parallel to the axis of symmetry of the tower.

On this axis of symmetry is disposed a sprayer 3, the spray cone of which is directed downwardly, i.e. cocurrently with the fines. A second sprayer 3', the spray cone of which is directed upwardly, is placed at a lower level. Both sprayers are mounted on sliding supports (not shown on the drawings) in a way such that they are adjustable in height according to the paste to be treated. Although only two sprayers are shown on FIGURE 1, it is to be understood that three, four or even more sprayers can be used in the same granulator.

The top of the spraying tower is surrounded by an annular chamber 4 provided with feeding ducts 5 for either drying or cooling gas. In order that the gas is uniformly distributed and has substantially the same velocity at any point within the tower, there are provided at least two and preferably three or four gas feeding ducts. Moreover, the openings through which the gas is fed into the tower are disposed regularly and uniformly about the lower end of the annular chamber. The gaseous streamlets thus obtained are practically parallel to the paths of the cores which are maintained well apart from each other: this arrangement reducing considerably the contact of cores having a wet or sticky coating thereon which causes the cores to stick together. The gas is discharged by means of blower 7 and leaves the tower through outlet 8 after having travelled therethrough from top to bottom. The gas is then sent to a dust collector of an usual type (not shown on the figure) placed at the outlet of the blower wherefrom it escapes to the atmosphere.

The granules built-up by successive coatings collect at the conical-shaped bottom of the tower which is connected to a return line 9 having a diameter smaller than that of the tower. In practice, the respective diameters of the tower and the return line are such that the velocity of the gas in the line is 5 to 10 times higher than its velocity in the tower. Due to the high velocity of the gas in pipe 9, the granules are carried pneumatically up to separator 10 where they are separated from the gas which escapes through line 11. The granules leaving separator 10 through pipe 12 provided with a gate valve 13 are sized on a sieve 14. Two fractions of granules are thus obtained: a marketable product which is sent, as diagrammatically shown by the arrow at 15, on a screw conveyor 16 and then to the bagging unit, or bulk storage area, and fines which leave sieve 14 through pipe 18. A honeycombed feeder 19 receives the fines coming from sieve 14 through pipe 18 and sends them through line 20 to distributor 2.

The separator 10 is placed high enough to allow the operation of classifying and recycling of the fines to be performed in cascade, the solids being circulated only by gravity. Such an arrangement avoids the use of a cumbersome and expensive mechanical handling equipment. During the pneumatic transport in line 9, the drying and cooling of the granules continues and is completed with the help of the increased heat exchange due to the high velocity of the gas.

Very often it is advantageous to inject an additional quantity of gas in the vicinity of the connecting point 8 between the bottom of the tower and the pneumatic transport pipe. This additional gas is injected through line 21 which is preferably provided with an ejector type device which also produces a suction, thus facilitating discharge of the granules from the tower bottom and a substantial acceleration thereof in return line 9. As is the case in other granulating processes, cold gas is injected at 21 when the paste to be treated is a melt, and hot gas when treating a solution or a slurry. Therefore, the injection of an additional quantity of gas provides further frigories, or calories respectively, which hastens and completes the cooling, or respectively the drying of the granules. Under these conditions, the fines recycled to the tower are also cooled, or respectively reheated, by the injection of cold or hot gas which improves the heat exchange between the cores and their coating of paste, thereby facilitating a rapid hardening of the coating.

Many different devices can be used to spray the paste onto the cores. When using a solid-cone spray i.e., a spray cone entirely filled with droplets, the arrangement of FIGURES 2 and 3 will preferably be adopted because the cores fall in the entire volume of the spray cones: the shower of fines has then the shape of a cylinder swept all over by the cores.

A hollow-cone spray can also be used i.e., a spray cone devoid of droplets in its central portion. In such a case, it is more preferable to prevent the cores from falling in the hollow part of the cone. FIGURES 4 and 5 show a preferred embodiment using a hollow-cone spray. A sheet-iron cylinder 22 placed between distributor 2 and sprayers 3 shepherds the fines and keeps them from falling in the axial zone of the tower.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process of granulating a paste in an enclosure having an upper and lower section by spraying said paste onto fines recycled from a prior operation in the presence of a gaseous flow stream, the process comprising charging said fines into an upper section of an enclosure having a vertical axis of symmetry, uniformly distributing said fines over at least a cross-sectional portion of the enclosure in an upper section thereof by passing said fines through a perforate distributor to provide lateral separation thereof and permitting said fines to fall by gravity following paths parallel to the axis of symmetry of said enclosure to form falling fines, passing a stream of gas downwardly into said falling fines and parallel to the axis of symmetry, projecting paste to be granulated from a spraying device positioned in the vicinity of the axis of symmetry onto said falling fines, thereby to uniformly coat the same and produce a product having a more uniform size.

2. The process of claim 1 wherein the projected paste forms a cone whose axis is parallel to the axis of symmetry of the enclosure.

3. The process of claim 1 wherein the paste is projected from a plurality of sprayers positioned at different levels within the enclosure.

4. The process of claim 1 wherein the paste is projected downwardly and cocurrently with said falling fines from sprayers mounted in the upper section of the enclosure.

5. The process of claim 1 wherein the paste is projected upwardly and countercurrently to said falling fines from sprayers mounted in the lower section of the enclosure.

6. The process of claim 1, further characterized in that coated granules are withdrawn from the bottom of the enclosure, passed to a classifying unit positioned above the enclosure, and separated into marketable product and fines to be recycled.

7. The process of claim 1 wherein coated granules are withdrawn from the bottom of the enclosure and pneumatically transported to a classifying unit positioned above the enclosure where they are separated into marketable product and fines to be recycled.

8. The process of claim 7 wherein an additional quantity of gas is injected into the enclosure in the vicinity of the point from which the granules are withdrawn from the enclosure, thereby to aid in pneumatically transporting the granules upwardly to a classifying unit.

9. The process of claim 1 wherein a portion of the paste is projected downwardly and concurrently to the falling fines from sprayer positioned in an upper section of the enclosure and another portion of paste is projected sprayers positioned in a lower section of the enclosure.

10. A process of granulating a paste in a two-ended tower having a vertical axis of symmetry and an upper and lower section by spraying said paste onto fines recycled from a prior operation, thereby coating said fines, comprising the steps of: feeding fines into an upper end of said tower, mechanically distributing said fines uniformly over at least a cross-sectional portion of said tower in an upper section thereof; flowing said uniformly distributed fines downwardly by gravity to form falling fines, introducing a gas stream into the upper section of the tower and passing the gas downwardly parallel to said axis of symmetry with said falling fines, atomizing a paste and injecting it into said gas stream and said falling fines in the form of a cone of particles whose axis is parallel to the axis of symmetry of the tower; thereby to uniformly coat said falling fines with the paste and increase the size thereof, collecting the resulting coated particles in the lower end of the tower and pneumatically transporting them upwardly outside of the tower to a zone of separation located above the tower, separating the particles from carrier gas, and then separating the particles into a coated product having a uniform desired size range and remaining fines passing said last-mentioned remaining fines downwardly as recycle feed to the tower.

11. The process of claim 10 wherein the atomized paste is projected in the form of a cone whose longitudinal axis is parallel with the axis of symmetry and having a hollow core and a zone of atomized paste, and said fines are distributed and passed into and through the zone of atomized paste.

12. The process of claim 10 wherein the paste is atomized from at least two sprayers positioned at different levels within the tower.

13. The process of claim 12 wherein at least one sprayer projects atomized paste upwardly countercurrent to said falling fines and at least one other sprayer projects atomized paste downwardly cocurrent to said falling fines.

14. An apparatus for granulating a paste comprising a two-ended tower having an upper and lower section and a vertical axis of symmetry, feeder means to feed particle fines at a controlled rate to an upper end of the tower, distributor means in the upper section of the tower to mechanically distribute said fines uniformly over at least a cross-sectional portion thereof, whereby said distributed fines are then released and fall by gravity to the lower end of the tower, means in the upper section of the tower to admit and uniformly distribute a gas downwardly over the cross section of the tower in which said distributed fines are falling, means positioned parallel to said axis of symmetry and below the distributor means to atomize and project paste into said falling fines thereby to coat the same and increase their size, a separation zone positioned above the tower, pneumatic means to fluidize and elevate coated particles collected in the lower end of the tower to said separation zone, means in said separation zone to remove gases from the coated particles and classify them into a product having a uniform desired size range and remaining fines, and conduit means to pass said remaining fines downwardly from the separation zone to an inlet of said feeder means.

15. The apparatus of claim 14, wherein the tower is of generally cylindrical shape.

16. An apparatus for granulating a paste comprising a tower having an upper and lower section and a vertical axis of symmetry, feeder means to feed particle fines at a controlled rate to an upper end of the tower, distributor means in an upper section of the tower to mechanically distribute said fines uniformly over at least a cross-sectional portion thereof, whereby said distributed fines are then released and fall by gravity to the lower end of the tower, means in the upper section of the tower to admit and uniformly distribute a gas downwardly over the cross section of the tower, in which said distributed fines are falling, means positioned parallel to said axis of symmetry and below the distributor means to atomize and project paste into said falling fines, thereby to coat the fines and increase their size.

17. An apparatus in accordance with claim 16, wherein a separation zone is positioned above said tower and pneumatic means are provided to fluidize and elevate coated particles collected in the lower end of said tower to said separation zone.

References Cited
UNITED STATES PATENTS

| | | | |
|---|---|---|---|
| 2,071,846 | 2/1937 | Lamb et al. | 118—303 |
| 2,561,392 | 7/1951 | Marshall | 117—100 |
| 2,586,818 | 2/1952 | Harms | 117—100 X |
| 2,600,523 | 6/1952 | Lutz | 118—303 X |
| 2,644,769 | 7/1953 | Robinson | 117—100 X |
| 2,768,095 | 10/1956 | Tadema et al. | 117—100 |
| 2,986,475 | 5/1961 | Mesnard et al. | 117—100 |
| 3,106,492 | 10/1963 | MacDonald et al. | 118—303 X |
| 3,110,626 | 11/1963 | Larson et al. | 117—100 X |
| 3,112,274 | 11/1963 | Morgenthaler et al. | 117—100 X |
| 3,118,459 | 1/1964 | Stumpf | 118—303 X |
| 3,143,428 | 8/1964 | Reimers et al. | 118—303 X |
| 3,237,596 | 3/1966 | Grass et al. | 118—303 X |
| 3,354,863 | 11/1967 | Reynolds | 117—100 X |

WILLIAM D. MARTIN, Primary Examiner

M. R. P. PERRONE, Jr., Assistant Examiner

U.S. Cl. X.R.

18—2.7; 117—100; 118—303

UNITED STATES PATENT OFFICE
CERTIFICATE OF CORRECTION

Patent No. 3,475,195                    Dated October 28, 1969

Inventor(s) Bernard Quanquin, Georges Marie Le Clerc and Jean-Louis Pierre

It is certified that error appears in the above-identified patent and that said Letters Patent are hereby corrected as shown below:

Column 4, line 49: "sprays" should be --sprayers--.

Column 6, line 17: The line should read: -- over, the openings 6 through which the gas is fed into the--.

Column 7, lines 71 and 72: The lines should read --the enclosure and another portion of paste is projected upwardly and countercurrently to said falling fines from sprayers positioned in a lower section of the enclosure.--.

SIGNED AND SEALED
AUG 25 1970

(SEAL)
Attest:

Edward M. Fletcher, Jr.
Attesting Officer

WILLIAM E. SCHUYLER, JR.
Commissioner of Patents